(12) United States Patent
Rippenhagen et al.

(10) Patent No.: US 6,243,612 B1
(45) Date of Patent: Jun. 5, 2001

(54) PROCESSING SYSTEM HAVING A SCHEDULING SYSTEM BASED ON A COMPOSITE RATIO OF PROCESS SCHEDULING FACTORS

(75) Inventors: Clay L. Rippenhagen; Shekar Krishnaswamy, both of Austin; Anthony R. Baker, Dripping Springs; Nipa Patel, Austin; Victor Palmeri, Austin; Jeriad Zoghby, Austin; Liming Shao, Austin, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/188,740

(22) Filed: Nov. 9, 1998

(51) Int. Cl.[7] .................................................... G06F 19/00
(52) U.S. Cl. ........................................... 700/100; 700/97
(58) Field of Search ............................. 700/99, 100, 101, 700/102, 103, 97

(56) References Cited

U.S. PATENT DOCUMENTS

| | | | |
|---|---|---|---|
| 3,703,725 | 11/1972 | Gomersall et al. | 700/97 |
| 4,888,692 | 12/1989 | Gupta et al. | 700/96 |
| 5,291,394 | 3/1994 | Chapman | 705/8 |
| 5,612,886 | * 3/1997 | Weng | 700/101 |
| 5,721,686 | * 2/1998 | Shahraray et al. | 700/102 |
| 5,748,478 | 5/1998 | Pan et al. | 700/99 |
| 5,818,716 | * 10/1998 | Chin et al. | 700/100 |
| 5,826,236 | * 10/1998 | Narimatsu et al. | 705/8 |
| 5,889,673 | * 3/1999 | Pan et al. | 700/97 |

\* cited by examiner

Primary Examiner—William Grant
Assistant Examiner—Zoila Cabrera
(74) Attorney, Agent, or Firm—Skjerven Morrill MacPherson, LLP (57) ABSTRACT

A processing system includes a scheduling system to scheduling processing of lots which are distributed among various processing system stations. Process scheduling is determined in accordance with lot specific composite ratios which are a function of process scheduling factors. Such process scheduling factors include, for example, a processing system efficiency, customer factors, and market factors. Processing system efficiency is influenced by a hunger ratio which is a ratio of the time when a particular lot is needed by a next constraint resource in the lot's process flow and the planned cycle time of a select lot to such next constraint resource. Customer factors include a critical ratio of the lateness of a lot relative to the lot's due date, and market factors reflect the relevant market priority of the lot. The process scheduling factors may be weighted to control their influence on the composite ratio.

49 Claims, 4 Drawing Sheets

PROCESSING SYSTEM HAVING A SCHEDULING SYSTEM BASED ON A COMPOSITE RATIO OF PROCESS SCHEDULING FACTORS

BACKGROUND OF THE INVENTION

1. Field of the Invention

The present invention relates to a processing system and more particularly relates to a processing system, such as a semiconductor manufacturing system, that includes a scheduling system for scheduling processing of lots based on a composite ratio which focuses on selected process scheduling factors such as, processing system efficiency, such as, providing continuous work to constraint resources in the processing system, and on other process scheduling factors such as customer factors and market factors which may influence scheduling of processes.

2. Description of the Related Art

Processing systems such as manufacturing systems often utilize one or more manufacturing lines or process paths, each having a variety of equipment stations to convert lots of material into useful articles. The lots of material may be any raw material, processed material, components, or other tangible item. Typically, each lot is transported to stations, and each piece of equipment at each station carries out a specific operation or process on the lots. In a reentrant processing system, one or more process paths proceed from a station and reenter or return to that station at some later time for further processing subsequent to processing at that station or at another station. For example, in a semiconductor manufacturing system, lots, which in such case are generally silicon based wafers, may flow along a process path of a cleaning equipment station, photo lithographer equipment station, to an etching equipment station, to an implanter equipment station, return to the cleaning equipment station, return to the photo lithographer equipment station, and so on until a complete integrated circuit is manufactured.

Careful scheduling of process operations at stations in process paths is generally essential to such a system operating efficiently. Processing systems such as semiconductor manufacturing facilities and other facilities where process paths include multiple equipment resources are generally especially sensitive to lot processing scheduling issues. Thus, industries have expended a tremendous amount of effort in extensively utilizing resource planning to increase processing efficiency by appropriately scheduling processing of lots.

Some sophisticated scheduling systems coordinate facility wide planning by globally defining the manufacturing process. Such facility wide planning typically includes identifying constraint resources, also commonly referred to as bottleneck operations. An equipment station is considered a constraint resource if its remaining available production capacity is relatively small such as less than about five per cent (5%). It is a generally accepted theory that manufacturing efficiency and thus overall manufacturing system capacity is determined by constraint resources. The need to avoid starvation, i.e. idle time or queue depletion, of a constraint resource, is discussed in Goldratt, Eliahu, "Theory of Constraints". Thus, an overall approach to increasing the efficiency of a manufacturing system attempts to ensure that constraint resources are "fed", i.e. lots are provided to the constraint resource, by ensuring that queues of lots are replenished at the constraint resource so as to keep usage of the constraint resource as close to one hundred per cent (100%) as possible.

In the manufacturing process, queues of lots are distributed among various equipment resource stations in accordance with the process stage of each particular lot. The process scheduling of such lots are often driven solely by customer due dates. However, dispatching of lots at the stations for processing by the respective stations solely in accordance with customer due dates does not always result in optimal constraint resource utilization especially in a highly reentrant processing system. Additionally, conventional scheduling systems especially in highly reentrant processing environments, have typically proved inadequate in maintaining high usage of constraint resources.

SUMMARY OF THE INVENTION

In one embodiment of the present invention, a processing system includes a scheduling system which schedules processing of lots at stations in the processing system based on a composite ratio for each lot of process scheduling factors. The composite ratio of each lot, in one embodiment, provides a single measure for each lot that is based on multiple process scheduling factors such as manufacturing efficiency, customer delivery due dates, and other relevant process scheduling factors such as market factors.

In one embodiment, a scheduling system utilizes a composite ratio for each lot which is a function of respective process scheduling influencing factors that determine a process scheduling order for the lots on a station by station basis. One such factor is, for example, a measure referred to as a 'hunger ratio' which relates to processing system efficiency. The hunger ratio of each lot is utilized by a scheduling system to facilitate processing system efficiency by driving lots of inventory to all occurrences of a defined constraint resource(s) in the processing system to prevent starvation of the constraint resource(s). Another illustrative factor is a 'critical ratio' of each lot. The critical ratio focuses on a due date for the completion of all processing on a lot, and, thus, drives lot process scheduling toward such completion due dates. Another illustrative factor is a 'market factor' for each lot. The market factor influenced the scheduling system to drive lot process scheduling based on market factors such as relative customer importance and market sales price.

In one embodiment of the present invention, a scheduling system combines the hunger ratio with at least one other process scheduling influencing factor such as the critical ratio and/or market factor of each lot to generate respective composite ratios which are used to determine the processing order of lots queued among stations in a processing system. Each scheduling influencing factor may be weighted to assign the desired influence of each process scheduling factor on the composite ratio., The composite ratio, in one embodiment, provides a scaleable measure upon which to base lot processing scheduling.

In one embodiment, the hunger ratio is generally defined as a ratio of the time, TNBNLy, in which a lot Ly will be needed at the next constraint resource in the lot's process path to the time expected for a select lot to arrive at the next constraint resource based on the select lot's current stage on the process path. TNBNLy is, in one embodiment, defined by the aggregate processing times by the next constraint resource of lot Ly of all lots proceeding to the same next constraint resource as lot Ly that have a planned cycle time which is less than the planned cycle time of the select lot. In one embodiment, the planned cycle time of lot Ly is the estimated time needed for lot Ly to proceed from the lot's current station after processing by the station until lot Ly arrives at the next constraint resource. Other processing stations may be interposed between the lot Ly's current station and the next constraint resource. Additionally, TNBNLy may be reduced by a time safety buffer of the next constraint resource of lot Ly by, for example, subtracting the time safety buffer from TNBNLy. The 'select lot' is determined in one embodiment by the desired inclusion of lots in determining the hunger ratio. In one embodiment, the select lot is lot Ly and, in another embodiment the select lot is a lot queued at the same station as lot Ly and having the greatest planned cycle time to the select lot's next constraint resource.

In one embodiment of the present invention, a method of scheduling processing of lots queued at stations including constraint resources in a processing system includes the step of scheduling processing of the lots by the stations at which the lots are queued, wherein a process scheduling order of the lots is influenced by respective hunger ratios of each lot, wherein a hunger ratio of each respective lot includes a quotient of a respective time that such lot is needed by the next constraint resource of such lot and a respective estimated time for a select lot Ls to arrive at the next constraint resource of lot Ls.

In a further embodiment of the invention, a manufacturing system includes a scheduling system to schedule processing of n lots L1:Ln by stations at which the lots are queued, wherein the process scheduling order of lot Ly precedes all lots of lots L1:Ln that are queued at the same station as lot Ly whose composite ratio indicates a lower processing priority than a composite ratio, COMPRLy, of lot Ly, wherein the composite ratio of a lot Ly includes a hunger ratio, HRLy, and the hunger ratio of lot Ly is the ratio of the approximate time the lot Ly is needed at the next constraint resource of the lot Ly to the approximate time for a select lot Ls to arrive at the next constraint resource of the lot Ls.

In another embodiment of the present invention, a scheduling system includes a scheduling module to determine the sums, ΣPTBNSL1:ΣPTBNSLn, wherein ΣPTBNSLy includes the sum of all process times of the next constraint resource BNi of lot Ly of lots L1:Ln which have planned cycle times less than the planned cycle time, PCTLy, of lot Ly to the next constraint resource BNi of lot Ly, to add the process times, ΣPTWIPQi, of any work in process, WIP, at the next constraint resource BNi of lots L1:Ln, respectively, to ΣPTBNSL1:ΣPTBNSLn, respectively, to determine the times, TNBNL1:TNBNLn, needed at the next constraint resources of L1:Ln, respectively, and to schedule processing of lots L1:Ln queued among a plurality of stations at which each of lots L1:Ln is scheduled to be processed prior to all lots at the same station having a respective composite ratio that corresponds to a lesser need for such lots, wherein the composite ratio for each lot Ly comprises a respective hunger ratio HRLy, and HRLy comprises a quotient of TNBNLy and PCTLy.

BRIEF DESCRIPTION OF THE DRAWINGS

Features appearing in multiple figures with the same reference numeral are the same unless otherwise indicated.

DESCRIPTION OF THE PREFERRED EMBODIMENT(S)

The following description of the invention is intended to be illustrative only and not limiting.

The following abbreviations and definitions are used herein unless otherwise indicated:

BNi=Constraint resource BNi, i=1, 2, . . . , m.

CMPRLy=The composite ratio for lot Ly.

COMPTLy=The approximate amount of time by which the lot Ly is early or late with respect to a time that lot Ly is due to complete such processing.

CRLy=The critical ratio for lot Ly.

DDATELy=The due date or time on which lot Ly is due to complete processing in a processing system.

HRLy=The hunger ratio of lot Ly.

lot=A unit of material which consists of one or more tangible items.

Ly=Lot y,y=1, 2, . . . , n.

MFLy=The market factor for lot Ly.

Next constraint resource of lot Ly=The next downstream constraint resource on the process path of lot Ly.

PCTLy=The planned cycle time of lot Ly to the next constraint resource BNi of lot Ly.

PTBNLy=The process time of lot Ly by the next constraint resource BNi of lot Ly.

PTBNSLy=The set of all process times by constraint resource BNi for all lots in the set WIPBNSLy.

ΣPTBNSLy=The sum of all process times by constraint resource BNi in the set PTBNSLy.

PTWIPQi=The process time by constraint resource BNi of each lot queued at constraint resource BNi.

ΣPTWIPQi=The sum of all PTWIPQi of each lot queued at constraint resource BNi.

STx=An equipment station x, x=1, 2, . . . , m.

TNBNLy=The time lot Ly is needed at the next constraint resource of lot Ly.

TBBNi=The time buffer for constraint resource BNi.

WIP=Work in process.

WIPBNLy=The set of all lots on a process path with the same next constraint resource BNi as lot Ly and having respective planned cycle times to constraint resource BNi less than PCTLy.

"x:y"=Item x through item y.

Processing systems often require active scheduling of events so that resources of the processing system are appropriately utilized to achieve increased processing system efficiency. "Efficiency" of a processing system is generally defined as the amount of lot throughput versus the amount of time to produce such throughput. In a complex processing system having multiple processing stations including multiple constraint resources, event scheduling often significantly influences the efficiency of such system. Processing systems with multiple stations having lots at various stages of completion introduce complexity into event scheduling. Highly reentrant systems introduce a further level of complexity into event scheduling as lots queued at a station often are at various stages of production and may traverse or flow different process paths following processing at each successive station.

Additionally, other process scheduling factors in addition to processing system efficiency are also often important in determining the station by station scheduling order of lots. Such other process scheduling factors include processing completion due dates based on, for example, customer delivery due dates and include market factors such as customer importance, market sales price, and publicity. In one embodiment, each composite ratio of selected process scheduling factor(s) for each lot provides a singular measure by which a scheduling system determines the process order for each lot by station at which each lot is queued the composite ratio is, for example, a combination of process scheduling factors such as an aggregate combination. Furthermore, each process scheduling factor may be weighted by, for example a real number multiplicand, to control the influence of each process scheduling factor on the composite ratio. The composite ratio may be updated in accordance upon receipt of updated process scheduling factor data. Thus, if real-time process scheduling factor data is available, the composite ratio may provide a real-time, easily interpreted solution to lot process scheduling issues.

In one embodiment, lots queued at a station are scheduled for processing in a processing system by a scheduling system which utilizes a processing system efficiency scheduling factor referred to as a "hunger ratio". The scheduling system determines a hunger ratio for each lot at every station. The hunger ratio, as further described below, focuses on the need to provide continuous work to all constraint resources in a system to minimize their remaining available production capacity. Thus, starvation of the constraint resources is reduced or eliminated which increases the efficiency of the processing system. In one embodiment, the hunger ratio of each lot is not proximity sensitive with the respect to the next constraint resource of each lot. Scheduling of lots may be based solely on the hunger ratio of each lot.

In one embodiment, the scheduling system utilizes a customer process scheduling factor referred to as a "critical ratio" to schedule processing of lots queued at a station. The scheduling system determines a critical ratio for each lot at every station. The critical ratio, as further described below, focuses on the need to meet lot processing completion due dates such as customer driven deadlines. Thus, customer factors may be taken into account when determining the processing order of each lot in the system.

In one embodiment, the scheduling system utilizes a market process scheduling factor referred to as a "market ratio" to schedule processing of lots queued at a station. The scheduling system determines a market factor for each lot at every station. The market factor, as further described below, focuses on the need to meet market forces driven goals such as publicity, relative customer importance, and market sales price. Thus, market factors may be taken into account when determining the processing order of each lot in the system.

In one embodiment, the process scheduling factors are selectively combined into a composite ratio for each lot, and the composite ratio provides a single measure which may be appropriately sorted to determine a desired processing order of each lot by the station at which each lot is respectively queued. The composite ratio is, for example, sorted such that lot Ly is processed prior to other lots queued at the same station as lot Ly if the composite ratio of process scheduling factors for lot Ly indicates a greater need to begin processing lot Ly than for processing the other such lots.

Figure 1:
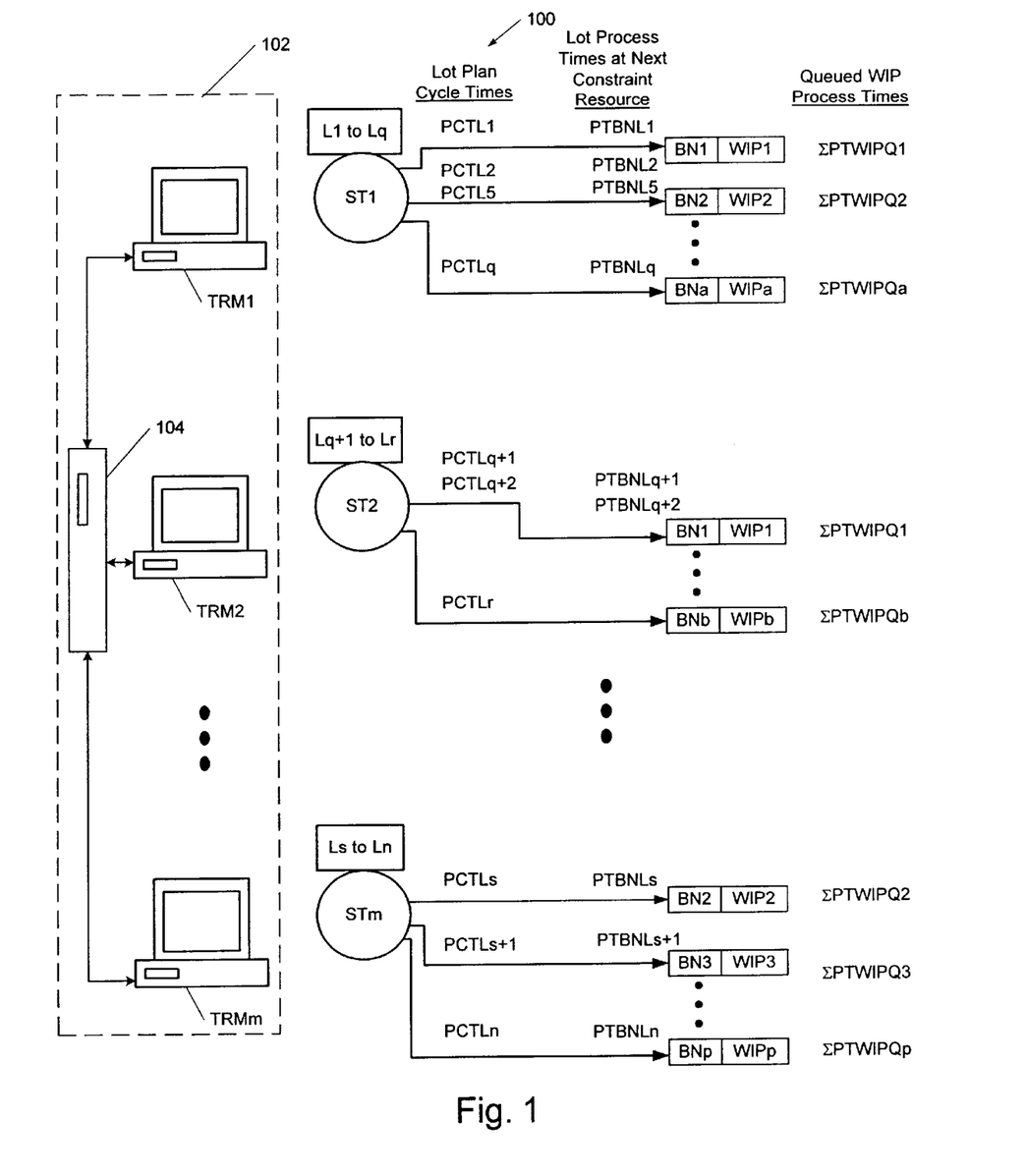
FIG. 1 is a manufacturing system having a scheduling system and a plurality of stations and constraint resources.

Referring to FIG. 1, one embodiment of a processing system is manufacturing system 100 which in one embodiment is a semiconductor manufacturing system. The manufacturing system 100 may be a reentrant or nonreentrant system. The manufacturing system 100 utilizes a "composite ratio" based scheduling system 102 to schedule processing of each lot Ly, y=1, 2, . . . , n, queued at a respective station STx, x=1, 2, . . . , m, in the manufacturing system 100. In one embodiment, the process scheduling factor components of the composite ratio reduce (i) processing system data, such as real-time data, related to the current processing stage and process flow of each lot Ly in the processing system, (ii) characteristics of constraint resources, (iii) lot process completion deadlines, and (iv) related market factors into a single unique composite ratio parameter for each lot Ly. The hunger ratio of each lot Ly allows scheduling system 102 to schedule processing of lots to feed each constraint resource BNi, i=1, 2, . . . , p, based on a ratio of the time, TNBNLy, in which lot Ly is needed at the next constraint resource of lot Ly to the planned cycle time of a select lot, such as lot Ly. A lot is, for example, one or more wafers which may be silicon or germanium based and serve as the substrate upon which integrated circuits are manufactured by manufacturing system 100.

The scheduling system 102 schedules the processing order of n lots which are distributed among m different stations, where n and m are integers. In manufacturing system 100 each station STx, x=1, 2, . . . , m, is, for example, equipment used for processing lots into integrated circuits such as etching equipment, stepper equipment, cleaner equipment, deposition equipment, thin film equipment, polishing equipment, diffusion equipment, and other equipment which will be apparent to persons of ordinary skill in the art.

Figure 2:
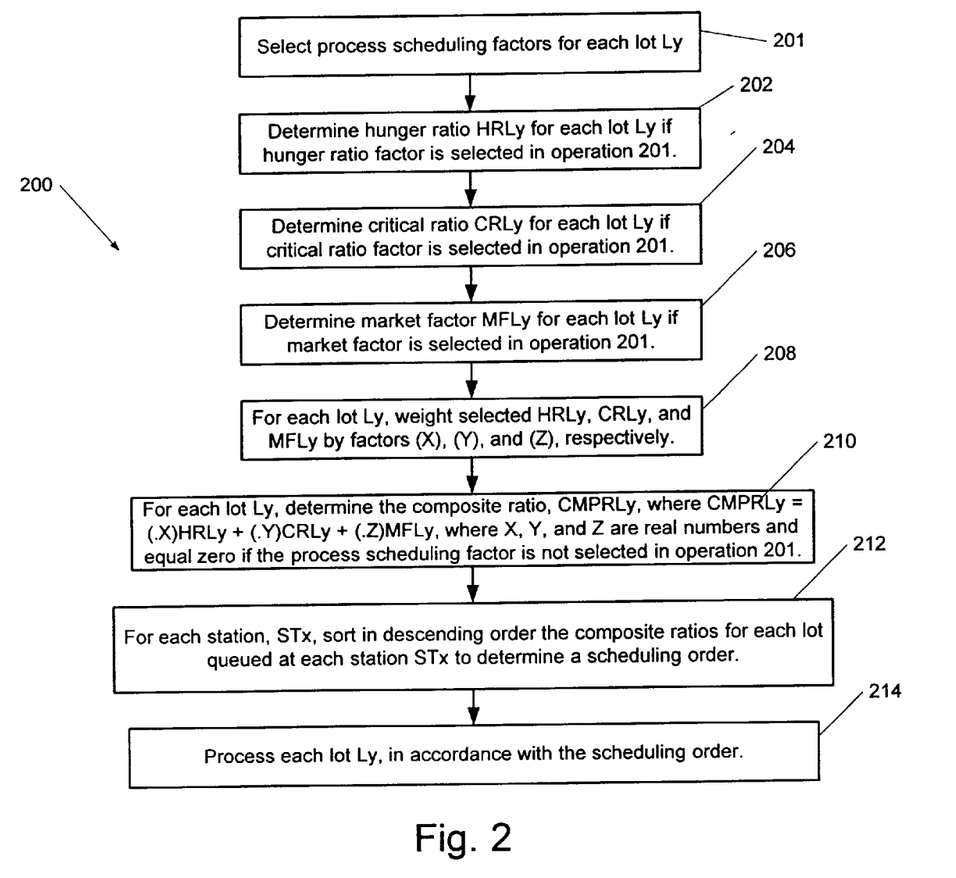
FIG. 2 is a flow chart to determine an embodiment of a composite ratio for a scheduling process of lots in a processing system.
Figure 3:
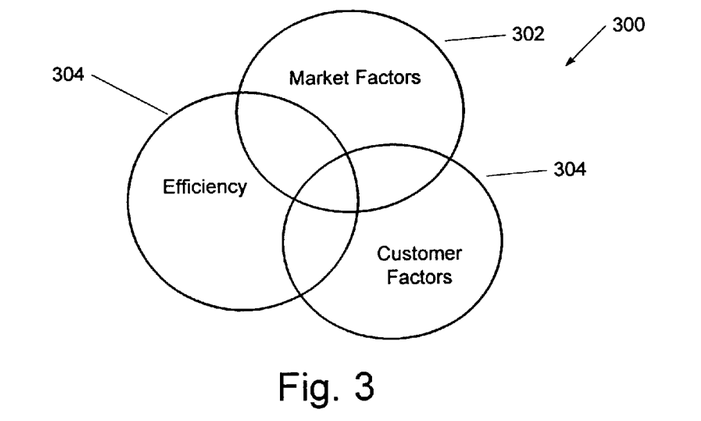
FIG. 3 is a diagram of an interrelationship of process scheduling factors.

Referring to FIGS. 1 and 2, the scheduling system 102 is illustratively depicted as a distributed computing system having client terminals TRM1:TRMm coupled to a central computing system 104. Each of the client terminals TRM1:TRMm includes a monitor for displaying lot scheduling information. The composite ratio and scheduling order determination operation 200 may be implemented as instructions and data (a scheduling module) on a computer readable media of scheduling system 102 and executed by a processor of scheduling system 102. In factor selection operation 201 of composite ratio and scheduling order determination operation 200, scheduling system 102 selects process scheduling factors for inclusion in the composite ratio CMPRLy of each lot Ly. The selection process is based on identifying process scheduling factors which are desirable to affect scheduling of lots L1:Ln queued at stations ST1:STm. In one embodiment of factor selection operation 201 shown in FIGS. 2 and 3, three such process scheduling factors are identified: processing system efficiency as affected by the hunger ratio, customer factors as affected by the critical ratio, and market factors.

If in factor selection operation 201, efficiency is selected as a process scheduling factor, scheduling system 102 determines in hunger ratio determination operation 202 the hunger ratios HRL1:HRLn of lots L1:Ln, respectively, as described below with reference to hunger ratio determination and lot scheduling process 400.

If in factor selection operation 201, customer factors are selected as a process scheduling factor, scheduling system 102 in critical ratio determination operation 204 determines the critical ratios CRL1:CRLn for lots L1:Ln, respectively. In one embodiment, CRLy is the quotient of (i) COMPTLy, the approximate amount of time by which lot Ly is early or late with respect to a time, DDATELy, that lot Ly is due to complete such processing. COMPTLy equals the approximate time, EEPCTLy, until the lot Ly completes processing in the manufacturing system 100 less DDATELy such that COMPTLy is a positive number if lot Ly is late. In one embodiment, CRLy=(COMPTLy/DDATELy), and, in this embodiment, CRLy may also be referred to as a 'lateness' factor. It will be recognized by persons of ordinary skill in the art that other expressions of the critical ratio may be used such as a ratio between the approximate amount of time estimated to complete processing to DDATELy. Predicting COMPTLy is, for example, based on process system modeling data and the current stage of lot Ly on the process path of lot Ly. Determining process system modeling data is process system dependent; however, methods known by persons of ordinary skill in the art may be used.

If in factor selection operation 201, market factors are selected as a process scheduling factor, scheduling system 102 in market factor determination operation 206, determines the market factors MFL1:MFLn for lots L1:Ln, respectively. The market factors MFL1:MFLn are numbers assigned to reflect the market factor priority of each lot relative to all other lots in manufacturing system 100. In one embodiment, a larger MFLy is assigned for higher the market factor priority of lot Ly. Thus, for example, if the market factor priority of lot L1 is greater than the market priority of lot L2, MFL1>MFL2.

A composite ratio, CMPRLy, is determined by scheduling system 102 where CMPRLy is a function of process scheduling factors such as HRLy, CRLy, and MFLy. In the embodiment as illustrated by composite ratio determination operation 208, CRLy=(.X)HRLy+(.Y)CRLy+(.Z)MFLy, where process scheduling weighting factors X, Y, and Z are real numbers and .X+.Y+.Z=1. If any of the process scheduling factors HRLy, CRLy, and MFLy are not selected in factor selection operation 201, the weighting factors of such nonselected process scheduling factor is set to zero. Thus, CMPRLy may be a function of any one or more process scheduling factors. It will be recognized by persons of ordinary skill in the art that other functions including other combinations of process scheduling factors may be used to determine CMPRLy such as multiplying combinations of process scheduling factors, Referring to FIG. 3, processing scheduling weighting factors are determined by the relative importance of their associated process scheduling factor so as to appropriately influence the value of the composite ratio. For example, if the efficiency of manufacturing system 100 is not of particular concern, then the process weighting factor X will by smaller than Y and Z. Likewise, the more importance assigned to an associated process scheduling factor, the larger the product of the process scheduling factor and weighting factor. Note that process scheduling factors are, for example, similarly such that the more importance assigned to an associated process scheduling factor, the larger the assignment of the associated process weighting factor.

Figure 4:
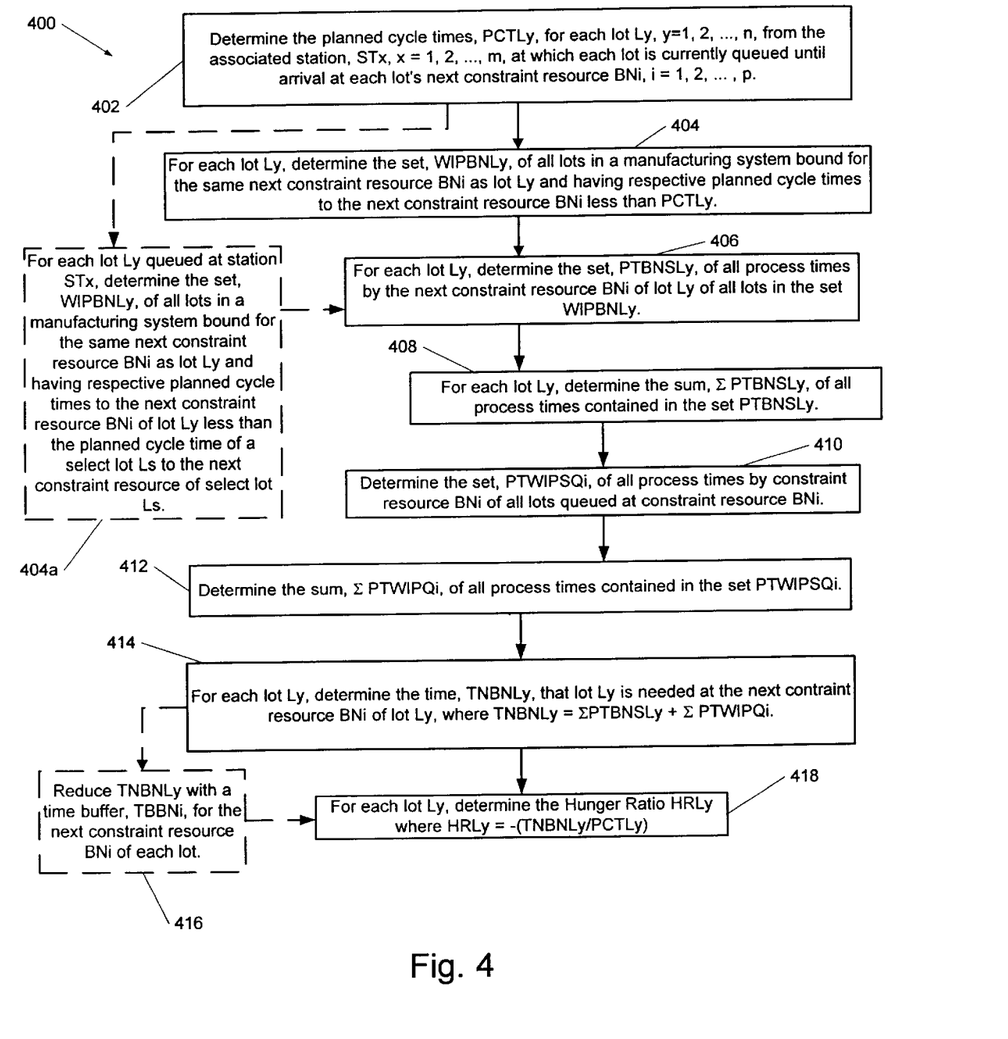
FIG. 4 is a flow chart to determine an embodiment of a hunger ratio for each lot in a processing system.

Prior to discussing operations 212 and 214, the hunger ratio is discussed in more detail directly below. Referring to FIGS. 1, 2, and 4, in one embodiment scheduling system 102 determines the hunger ratio for each of lots L1:Ln by performing hunger ratio determination operation 202 which is, in one embodiment, the hunger ratio determination and lot scheduling process 400. The hunger ratio determination and lot scheduling process 400 may be implemented by one of ordinary skill in the art as computer readable instructions which may be stored on a computer readable media, such as a hard disk drive memory, of the scheduling system 102. Such instructions may be executed by a processor of the scheduling system 102 which is coupled to such computer readable media. The actual hunger ratio determination and lot scheduling process 400 may be implemented by each of client terminals TRM1:TRMm, implemented by central computing system 104 and scheduling data distributed for display by client terminals TRM1:TRMm, or implemented in other methods using the same or different equipment as will be apparent to persons of ordinary skill in the art.

To determine the hunger ratios HRL1:HRLn of lots L1:Ln by their associated stations ST1:STm, i.e. by the stations at which lots L1:Ln are presently queued, scheduling system 102 performs planned cycle time operation 402. The planned cycle time operation 402 determines the planned cycle times PCTLy for each lot Ly, y=1, 2, . . . , n from the associated station STx, x=1, 2, . . . , m at which each lot Ly is currently queued until arrival at the next constraint resource BNi, i=1, 2, . . . , p, of lot Ly. The planned cycle time for lot Ly, PCTLy, represents the estimated time that will elapse from the time a lot leaves its current station STx until such lot Ly arrives at the next constraint resource BNi on lot Ly's processing path and downstream from lot Ly's present production stage. Thus, PCTLy, y=1, 2, . . . , n, includes the estimated time required to process lot Ly by all nonconstraint stations disposed between lot Ly and the next constraint resource BNi of lot Ly and includes transport times. PCTLy may also include times for estimated down times of intervening stations and other factors that persons of ordinary skill in the art will recognize as useful in determining planned cycle times. The planned cycle times PCTL1:PCTLn are generally determined by modeling the manufacturing process using methods well known to persons of ordinary skill in the art. Also, the planned cycle time PCTLy of each lot Ly may be expressed in, for example, any unit of time or may be normalized based on, for example, the smallest PCTLy.

FIG. 1 illustrates exemplary lot plan cycle times, PCTL1:PCTLn, associated stations, ST1:STm, and next constraint resources, BN1:BNp, of manufacturing system 100 as determined at a particular instant in time. In one embodiment, at a particular instant in time, lots L1:Lq are queued at station ST1, and lot L1 has a planned cycle time PCTL1 to its next constraint resource BN1, lots L2 and L5 have planned cycle times PCTL2 and PCTL5, respectively, to next constraint resource BN2, lot Lq has a planned cycle time PCTLq to its next constraint resource BNa, and so on, so that each of the q lots queued at station ST1 has a determined planned cycle time to a next constraint resource BNi, i=1, 2, . . . , a of each lot Ly, y=1, 2, . . . , q, where a and q are respective integers. Note that in a reentrant system, lots L1:Lq may be at different stages of completion and may be allocated to the manufacturing of, for example, different integrated circuits. Thus, for example, planned cycle time PCTL2 may or may not equal planned cycle time PCTL5. Additionally, each of the remaining m stations STx, x=1, 2, . . . , m, may include lots queued for processing. For example, lots Lq+1:Lr are queued at station ST2, and lots Lq+1 and Lq+2 have planned cycle times PCTLq+1 and PCTLq+2 to next constraint resource BN1, lot Lr has a planned cycle time PCTLr to its next constraint resource BNb, and so on, so that each of Lots Lr:Lq+1 queued at station ST2 has a determined planned cycle time PCTLr:PCTLq+1, respectively, to a next of b different constraint resources BNi, i=1, 2, . . . , b, where b is an integer. Additionally, lots Ls:Ln are queued at station STm, and lot Ls has a planned cycle time PCTLs to its next constraint resource BN2, lot Ls+1 has a planned cycle time PCTLs+1, respectively, to next constraint resource BN3, lot Ln has a planned cycle time PCTLn to its next constraint resource BNp, and so on, so that each of the lots Lsn:Ln lots queued at station STm have determined planned cycle times PCTLs:PCTLn, respectively, to a next of p different constraint resources BNi, i=1, 2, ..., p, where s is an integer. Note that in one embodiment a=b=p.

In WIP toward constraint resource operation 404, scheduling system 102 determines for each lot Ly, the set, WIPBNLy, of all lots in the manufacturing system 100 which are bound for the same next constraint resource BNi as lot Ly and having respective planned cycle times to the next constraint resource BNi which are less than PCTLy. Rather than utilizing operation 404, scheduling system 102 may bypass operation 404 and utilize WIP toward constraint resource operation 404a. In WIP toward constraint resource operation 404a, scheduling system 102 determines, for each lot Ly, the set, WIPBNLy, of all lots in manufacturing system 100 which are bound for the same next constraint resource BNi as lot Ly and having respective planned cycle times to the next constraint resource BNi which are less than a select lot Ls. The select lot Ls is selected on the basis of defining the inclusion boundaries of set WIPBNLy. In one embodiment, the select lot Ls is lot Ly. In another embodiment, the select lot Ls is the lot queued at the same station STx as lot Ly that has the maximum to next constraint resource planned cycle time so that, for example, for station ST1, if lot Ly=lot L1 and PCLq is greater than PCTL1:PCTLq-1, then lot Ls=lot Lq. In another embodiment, the select lot Ls is the lot queued at the same station STx as lot Ly that has the maximum planned cycle time to the next constraint resource of lot Ly so that, for example, for station ST1, if lot Ly=lot L2 and PCTL5 is greater than PCTL2, then lot Ls=lot L5.

In process times determination operation 406, for each lot Ly, scheduling system 102 determines the set, PTBNSLy, of all process times by the next constraint resource BNi of lot Ly for all lots in the set WIPBNLy. Thus for example, in the embodiment of FIG. 4 and performing operation 404 as illustrated in FIG. 4, for lot L1, if PCTLq+1 and PCTLq+2 are the only planned cycle times less than PCTL1, then WIPBNL1={Lq+1, Lq+2 } and PTBNSL1={PTBNLq+1, PTBNLq+2}. Process times are dependent on, for example, the quantity, reliability, and the processing characteristics of the equipment making up each of the respective constraint resources BN1:BNp. Note that process times by the constraint resource BNi do not include queue times at the constraint resource BNi. Note that PTBNSLy may be expressed in any unit of, for example, time or normalized based on, for example, the smallest PTBNSLy.

In lot process times combination operation 408, scheduling system 102 determines for each lot Ly the combination of all process times contained in the set PTBNSLy. Such combination is in one embodiment, the sum, ΣPTBNSLy, of all process times contained in the set PTBNSLy. Thus, continuing the exemplary embodiment above, ΣPTBNSL1= PTBNLq+1+PTBNLq+2.

Constraint resources BNi often have respective queues of lots, WIPi, awaiting processing by constraint resource BNi. Prior to determining, TNBNLy, the time at which each lot Ly is needed at each lot's next constraint resource BNi, scheduling system 102 performs WIP queued at constraint resource process time operation 410. WIP queued at constraint resource process time operation 410 determines the set, PTWIPSQi, of all process times by constraint resource BNi of all lots queued at constraint resource BNi. Next, scheduling system 102 performs WIP queued at constraint source process time combination operation 412 to determine the combination of all process times contained in the set PTWIPSQi. In one embodiment, such combination is the sum, ΣPTWIPQi, of all process times contained in the set PTWIPSQi.

In the illustrative embodiment of FIG. 1, each constraint resource BNi is shown having various queued WIPi, and each queued WIPi has cumulative process time that represents the time needed by the constraint resource BNi to process the respective queued WIPi. Queued WIPi process times by constraint resource BNi may be expressed in any unit of, for example, time or normalized based on, for example, the smallest PTBNSLy. Table 1 sets forth the respective constraint resources BNi, associated queued WIPi, and associated aggregate queued WIPi process times for each constraint resource BNi.

TABLE 1

| Constraint Operation (BNi) | Queued Work in Process i (WIPi) | Aggregate WIP Process Times (ΣPTWIPQ) |
| --- | --- | --- |
| BN1 | WIP1 | ΣPTWIPQ1 |
| BN2 | WIP2 | ΣPTWIPQ2 |
| BN3 | WIP3 | ΣPTWIPQ3 |
| BNa | WIPa | ΣPTWIPQa |
| BNb | WIPb | ΣPTWIPQb |
| ... | ... | ... |
| BNp | WIPp | ΣPTWIPQp |

Scheduling system 102 next determines for each lot Ly the time, TNBNLy, that lot Ly is needed at the next constraint resource BNi of lot Ly. In one embodiment TNBNLy is a function of ΣPTBNSLy and ΣPTWIPQi. In one embodiment, the scheduling system 102 performs time needed at next constraint resource 414 where TNBNLy equals ΣPTBNSLy plus ΣPTWIPQi. Thus, TNBNLy provides an assessment of when each of the constraint resources BNi will need additional work to prevent starvation.

Time buffer operation 416 is an optional operation in which scheduling system 102 reduces the time needed at next constraint, TNBNLy, for each lot Ly for the next particular constraint resource of each lot Ly, thus, compensating for potential uncertainties in ΣPTBNSLy and/or ΣPTWIPQi for each lot Ly and the next constraint resource BNi of lot Ly, respectively. The time buffer is, for example, an amount of time, TBBNi, that reduces TNBNLy so that lots do not arrive 'just in time' and risk starvation of the next constraint resource. In one embodiment, a time buffer TBBNi for each constraint resource BNi is determined by dividing the mean time to repair for respective equipment of constraint resource BNi by the number of parallel processing equipment utilized by constraint resource BNi and weighting the result by a probability of failure of constraint resource BNi. Other TNBNLy compensating factors will be recognized by persons of ordinary skill in the art. Reduction of TNBNLy may be accomplished by subtracting TBBNi from TNBNLy.

If time buffer operation 416 is not utilized, scheduling system 102 proceeds directly to hunger ratio operation 414 from time needed at next constraint resource operation 414. In hunger ratio operation 418, scheduling system 102 determines the hunger ratio, HRLy, for each lot Ly where HRLy is a ratio of the time needed at next constraint TNBNLy to the planned cycle time PCTLy of the select lot, such as lot Ly. In one embodiment represented in hunger ratio operation 418, hunger ratio HRLy equals the negative of the time needed at next constraint TNBNLy divided by planned cycle time PCTLy, i.e. HRLy=-(TNBNLy/PCTLy). The hunger ratio HRLy may also be determined by dividing planned cycle time PCTLy by time needed at next constraint TNBNLy, and the minus sign may be dropped when using normalized values of TNBNLy and PCTLy. Thus, in addition to utilizing the time needed at next constraint TNBNLy, scheduling system 102 also accounts for occurrences of lots at respective stations ST1:STm which are at different stages in one or more process paths and have the same constraint resource BNi. Thus, the hunger ratio provides in a single measure data representing planned cycle times PCTL1:PCTLn of lots L1:Ln, respectively and the time needed by each of lots L1:Ln at their respective next constraint resource. A scheduling order of lots ma be determined by, for example, sorting HRLy such that lots are processed first if such lot are needed more by their next constraint resource relative to the select lot's planned cycle time. Thus, when HRLy=–(TNBNLy/PCTLy), processing order is determined by sorting HRLy in descending order for each station.

Referring to FIG. 2, to schedule processing of each lot Ly, scheduling system 102 sorts composite ratios CMPRL1:CMPRLn for lots L1:Ln, respectively, queued at a respective station STx, to schedule processing at the particular station STx associated with each lot Ly prior to all lots at the same station STx having a composite ratio that indicates a lower processing priority than the priority of lot Ly. When HRLy, CRLy, and MFLy are determined such that more positive HRLy, CRLy, and MFLy, respectively, indicate a greater hunger by the next constraint resource BNi of lot Ly, greater lateness by lot Ly, and more market factor importance, then in scheduling operation 220, scheduling system 102 sorts in descending order the composite ratios CMPL1:CMPLn for each of lots L1:Ln queued at the respective associated stations ST1:STm to determine respective scheduling orders of all lots queued at stations ST1:STm. The composite ratio, therefore, provides a single measure to schedule processing of lots L1:Ln at the stations ST1:STm at which such lots are queued in order to, for example, balance minimization of the remaining available production capacity of each of constraint resources BN1:BNp, completion due dates, and market factor influences on lot process scheduling.

Thus, for example, if HRLy=–TNBNLy/PCTLy and HRLq+1>HRL1>HRLq+2, CRLq+1=CRL1=CRLq+2, and MFLq+1=MFL1=MFLq+2, scheduling system 102 schedules lots Lq+1, L1, and Lq+2 to be processed in that order by station ST1 at which lots L1, Lq+1, and Lq+2 are currently queued. Thus, in one embodiment, the greater the disparity between the time when a lot, Ly, is needed at a constraint resource and the amount of time estimated for the lot to arrive at such constraint resource, the higher the processing priority of lot Ly will be.

The processing order for stations ST1:STm are displayed for station operators by terminals TRM1:TRMm, respectively. In an automatic loading station, the lot scheduling order would be automatically used by station terminals to schedule lot processing. Note that scheduling system 102 may recalculate scheduling order based on the availability of new data used to determine each hunger ratio HRLy such as lot processing stage data, WIP service time data, equipment down time, insertion of new lots into the process flow, and reevaluation of constraint resource processing times, and new data used to determine CRLy and MFLy as described above. Thus, if real time data is available, real time scheduling recalculations and any resulting adjustments may be made by scheduling system 102.

The manufacturing system 100 subsequently performs processing operation 214 and processes each lot Ly at the lot's current station STx in accordance with the scheduling order determined in scheduling operation 220.

Figure 5:
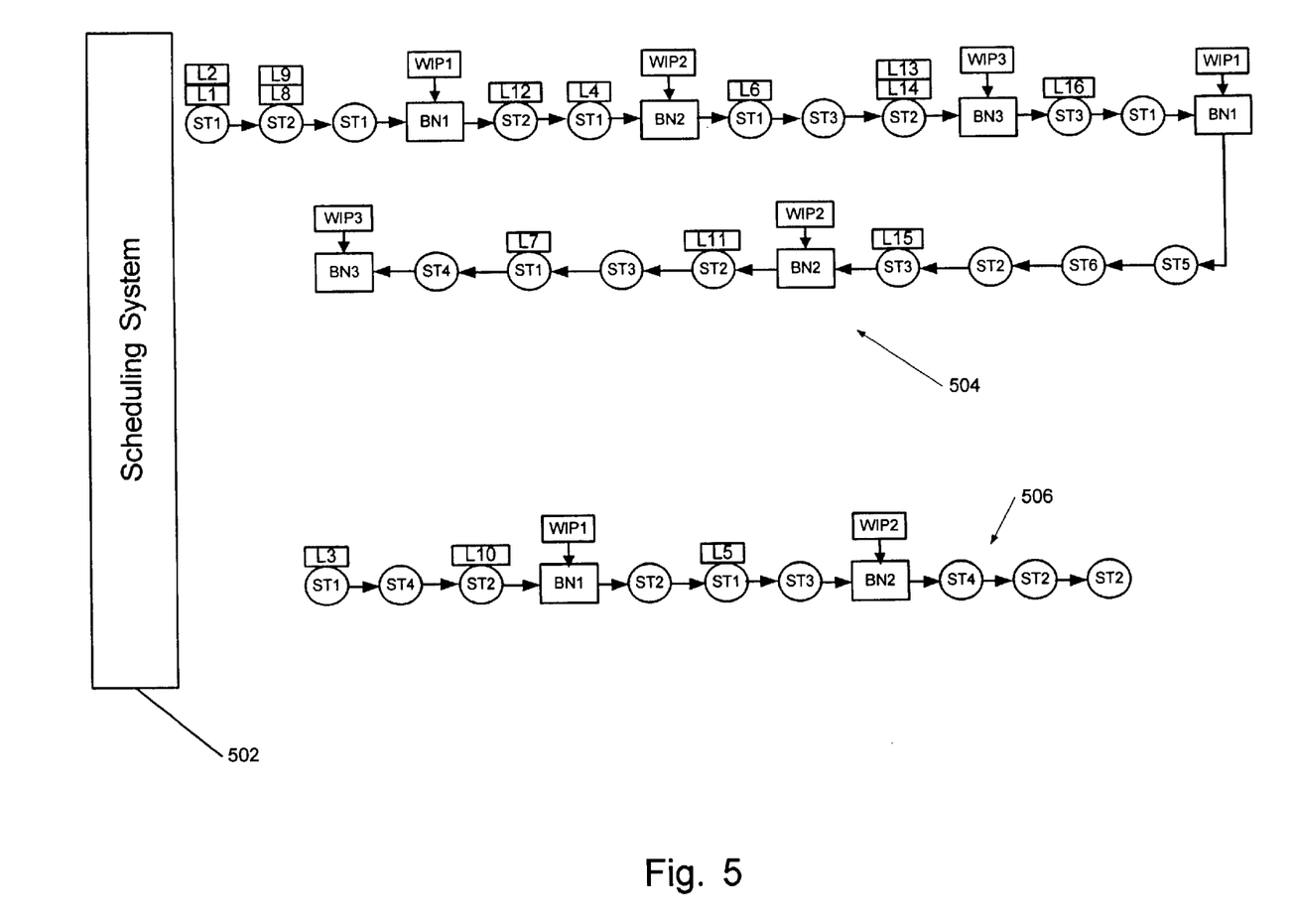
FIG. 5 is one embodiment of a reentrant manufacturing system.

Referring to FIG. 5, an embodiment of a processing system, semiconductor manufacturing system 500, is illustrated. Illustrative semiconductor manufacturing system 500 has lots L1:L16 distributed among stations ST1:ST3 as shown in FIG. 5. The semiconductor manufacturing system 500 also includes stations ST4:ST6 that have no queued lots. The following example illustrates use of a scheduling system 502 which utilizes the composite ratios CMPRL1:CMPRL16 of CRL1:CRL16, MF1:MF16, and hunger ratios HRL1:HRL16, as determined by executing hunger ratio determination process 400, to schedule processing of lots L1:L16, respectively. The scheduling system 502 is in one embodiment identical to scheduling system 102 with a number of terminals equal to the number of stations in semiconductor manufacturing system 500.

The semiconductor manufacturing system 500 is a highly reentrant processing system with lots L1, L2, L4, L6: L9, and L11:L16 located at various stations and located at various stages of process path 504, and lots L3, L5, and L10 and located at various stations and located at various stages of process path 506. Process paths 504 and 506 are, for example, illustrative reentrant manufacturing lines. The reentrant nature of semiconductor manufacturing system 500 is illustrated by, the recurrence of identical stations and constraint resources at various stages of process paths 504 and 506. Additionally, note that identical stations and constraint resources are utilized for multiple process paths.

The semiconductor manufacturing system 500 performs planned cycle time operation 402, and Table 2 depicts the plan cycle time PCTLy, next constraint resources BNi, critical ratio CRLy, and market factor MFLy for each lot Ly, and also depicts process times of WIP1:WIP3 queued at each of the constraint resources BN1:BN3. Of semiconductor manufacturing system 500. The numbers in Table 2 are illustrative only, and time units may reflect, for example, actual or normalized times.

TABLE 2

| Station (STx) | Lot (Ly) | Plan Cycle Time (PCTLy) | Process Time at Next Constraint Resource (PTBNLy) | Next Constraint Resource (BNi) | Critical Ratio (CRLy) | Market Factor (MFLy) |
|---|---|---|---|---|---|---|
| ST1 | 1 | 6 | 2 | 1 | −1 | 1.2 |
| ST1 | 2 | 6 | 1 | 1 | 0 | 1.3 |
| ST1 | 3 | 8 | 3 | 1 | 0 | 2 |
| ST1 | 4 | 2 | 1 | 2 | +1 | 0.5 |
| ST1 | 5 | 6 | 2 | 2 | +2 | 1.5 |
| ST1 | 6 | 9 | 2 | 3 | −2 | 1.4 |
| ST1 | 7 | 7 | 3 | 3 | 0 | 0 |
| ST2 | 8 | 4 | 4 | 1 | −2 | .7 |
| ST2 | 9 | 4 | 2 | 1 | +1 | .8 |
| ST2 | 10 | 1 | 5 | 1 | −1 | 1.6 |
| ST2 | 11 | 10 | 3 | 3 | −1 | 1.2 |
| ST2 | 12 | 4 | 2 | 2 | 0 | 4 |
| ST2 | 13 | 3 | 2 | 3 | +1 | 1.2 |
| ST2 | 14 | 3 | 1 | 3 | 0 | 0 |
| ST3 | 15 | 2 | 3 | 2 | −2 | .5 |
| ST3 | 16 | 5 | 2 | 1 | 0 | 1.7 |

Scheduling system 502 performs WIP toward constraint resource operation 404, process times determination operation 406, lot process times combination operation 408, WIP queued at constraint resource process time operation 410, WIP queued at constraint source process time combination operation 412, time needed at next constraint resource 414, and hunger ratio operation 418 to arrive at the data depicted in Table 3. Note that time buffers TBBN1:TBBN3 are not used in this embodiment but may be used in other embodiments.

TABLE 3

| Station (STx) | Lot (Ly) | Next Constraint Resource (BNi) | Process Time at Next Constraint Resource (PTBNLy) | ΣPTBNSLy | ΣPT-WIPQi | Plan Cycle Time (PCTLy) | Time Needed for Lot (Ly) at Next Constraint Resource (TNBNLy) | Hunger Ratio (HRLy) |
|---|---|---|---|---|---|---|---|---|
| ST2 | 10 | 1 | 5 | 0 | 6 | 1 | 6 | −6 |
| ST2 | 8 | 1 | 4 | 5 | 6 | 4 | 11 | −2.75 |
| ST2 | 9 | 1 | 2 | 5 | 6 | 4 | 11 | −2.75 |
| ST3 | 16 | 1 | 2 | 11 | 6 | 5 | 17 | −3.4 |
| ST1 | 1 | 1 | 2 | 13 | 6 | 6 | 19 | −3.17 |
| ST1 | 2 | 1 | 1 | 13 | 6 | 6 | 19 | −3.17 |
| ST1 | 3 | 1 | 3 | 16 | 6 | 8 | 22 | −2.75 |
| ST1 | 4 | 2 | 1 | 0 | 6 | 2 | 6 | −3 |
| ST3 | 15 | 2 | 3 | 0 | 6 | 2 | 6 | −3 |
| ST2 | 12 | 2 | 2 | 4 | 6 | 4 | 10 | −2.5 |
| ST1 | 5 | 2 | 2 | 6 | 6 | 6 | 12 | −2 |
| ST2 | 13 | 3 | 2 | 0 | 6 | 3 | 6 | −2 |
| ST2 | 14 | 3 | 1 | 0 | 6 | 3 | 6 | −2 |
| ST1 | 7 | 3 | 3 | 3 | 6 | 7 | 9 | −1.29 |
| ST1 | 6 | 3 | 2 | 6 | 6 | 9 | 12 | −1.33 |
| ST2 | 11 | 3 | 3 | 8 | 6 | 10 | 14 | −1.44 |

The scheduling system 502 performs scheduling operation 212 to determine the processing scheduling order for each lot by the station at which each lot is currently queued. Weighting factors in the composite ratio allow process scheduling factors to be excluded from the composite ratio. The process scheduling order depicted in Table 4 assumes that the critical ratio $CR_{Ly}$ and market factor $MF_{LY}$ are of no importance relative to processing system efficiency, and thus, for $.Y=.Z=0$, the semiconductor manufacturing system 500 processes each lot in processing operation 214 in accordance with such process scheduling order.

TABLE 4

| Station (STx) | Lot (Ly) | Process Scheduling Order | Hunger Ratio (HRLy) |
|---|---|---|---|
| ST1 | 7 | 1 | −1.29 |
| ST1 | 6 | 2 | −1.33 |
| ST1 | 5 | 3 | −2 |
| ST1 | 3 | 4 | −2.75 |
| ST1 | 4 | 5 | −3 |
| ST1 | 1 | 6 | −3.17 |
| ST1 | 2 | 7 | −3.17 |
| ST2 | 11 | 1 | −1.44 |
| ST2 | 13 | 2 | −2 |
| ST2 | 14 | 3 | −2 |
| ST2 | 12 | 4 | −2.5 |
| ST2 | 8 | 5 | −2.75 |
| ST2 | 9 | 6 | −2.75 |
| ST2 | 10 | 7 | −6 |
| ST3 | 15 | 1 | −3 |
| ST3 | 16 | 2 | 3.4 |

In another example, the scheduling system 502 performs scheduling operation 212 with $CMPRL_Y = .X(HRL_y) + .Y(CRL_y) + .Z(MFL_y)$ to determine the processing scheduling order for each lot by the station at which each lot is currently queued. The process scheduling order depicted in Table 5 assumes that the hunger ratio $HRL_y$ is still of primary importance; however critical ratio $CRL_y$ and market factor $MFL_y$ are considered of equal importance with $.X=0.6$, $.Y=0.2$, and $.Z=0.2$. The semiconductor manufacturing system 500 processes each lot in processing operation 214 in accordance with such process scheduling order.

TABLE 5

| Station (STx) | Lot (Ly) | Process Scheduling Order | CMPRLy (.X = .6; .Y = .2; .Z = .2) | Hunger Ratio (HRLy) | Critical Ratio (CRLy) | Market Factor (MFLy) |
|---|---|---|---|---|---|---|
| ST1 | 1 | 1 | −1.86 | −3.17 | −1 | 1.2 |
| ST1 | 2 | 2 | −1.64 | −3.17 | 0 | 1.3 |
| ST1 | 4 | 3 | −1.5 | −3 | +1 | 0.5 |
| ST1 | 3 | 4 | −1.25 | −2.75 | 0 | 2 |
| ST1 | 6 | 5 | −0.918 | −1.33 | −2 | 1.4 |
| ST1 | 7 | 6 | −0.774 | −1.29 | 0 | 0 |
| ST1 | 5 | 7 | −0.5 | −2 | +2 | 1.5 |
| ST2 | 10 | 1 | −3.48 | −6 | −1 | 1.6 |
| ST2 | 8 | 2 | −1.91 | −2.75 | −2 | .7 |
| ST2 | 9 | 3 | −1.29 | −2.75 | +1 | .8 |
| ST2 | 14 | 4 | −1.2 | −2 | 0 | 0 |
| ST2 | 11 | 5 | −0.824 | −1.44 | −1 | 1.2 |
| ST2 | 13 | 6 | −0.76 | −2 | +1 | 1.2 |
| ST2 | 12 | 7 | −0.7 | −2.5 | 0 | 4 |
| ST3 | 16 | 1 | −2.46 | −3.4 | 0 | 1.7 |
| ST3 | 15 | 2 | −2.1 | −3 | −2 | .5 |

In another example, the scheduling system 502 performs scheduling operation 212, and the process scheduling order depicted in Table 6 assumes that the critical ratio $CRL_y$ is of primary importance followed by the hunger ratio $HRL_y$ and market factor $MFL_y$ with $.X=0.25$, $.Y=0.7$, and $.Z=0.05$. The semiconductor manufacturing system 500 processes each lot in processing operation 214 in accordance with such process scheduling order.

TABLE 6

| Station (STx) | Lot (Ly) | Process Scheduling Order | CMPRLy (.X = .25; .Y = .7; .Z = .05) | Hunger Ratio (HRLy) | Critical Ratio (CRLy) | Market Factor (MFLy) |
|---|---|---|---|---|---|---|
| ST1 | 6 | 1 | −1.6625 | −1.33 | −2 | 1.4 |
| ST1 | 1 | 2 | −1.43 | −3.17 | −1 | 1.2 |
| ST1 | 2 | 3 | −0.7275 | −3.17 | 0 | 1.3 |
| ST1 | 3 | 4 | −0.5875 | −2.75 | 0 | 2 |
| ST1 | 7 | 5 | −0.3225 | −1.29 | 0 | 0 |
| ST1 | 4 | 6 | −0.025 | −3 | +1 | 0.5 |
| ST1 | 5 | 7 | 0.975 | −2 | +2 | 1.5 |

TABLE 6-continued

| Station (STx) | Lot (Ly) | Process Scheduling Order | CMPRLy (.X = .25; .Y = .7; .Z = .05) | Hunger Ratio (HRLy) | Critical Ratio (CRLy) | Market Factor (MFLy) |
|---|---|---|---|---|---|---|
| ST2 | 10 | 1 | −2.12 | −6 | −1 | 1.6 |
| ST2 | 8 | 2 | −2.0525 | −2.75 | −2 | .7 |
| ST2 | 11 | 3 | −1 | −1.44 | −1 | 1.2 |
| ST2 | 14 | 4 | −0.5 | −2 | 0 | 0 |
| ST2 | 12 | 5 | −0.425 | −2.5 | 0 | 4 |
| ST2 | 9 | 6 | 0.0525 | −2.75 | +1 | .8 |
| ST2 | 13 | 7 | 0.26 | −2 | +1 | 1.2 |
| ST3 | 15 | 1 | −2.125 | −3 | −2 | .5 |
| ST3 | 16 | 2 | −0.765 | −3.4 | 0 | 1.7 |

Thus, as shown in Tables 4 through 6, the scheduling order of lots in a processing system is determined by ordering the composite ratios of each lot in accordance with the priority assigned to each process scheduling weighting factor and processing priority of the lot as indicated by the need for the lot to be processed which is reflected in the values of the respective process scheduling factors. Thus, each process scheduling factor of each composite ratio reflects a respective processing priority of each respective lot. The composite ratio, as a finction of the process scheduling factors, blends the plurality of process scheduling factor into a unique value that is sorted in the order of lot processing priority to generate a lot scheduling order. For example, the greater the need of a constraint resource for a lot, the higher the lot's processing priority is with respect to efficiency, the greater the lateness of a lot, the higher the lot's processing priority with respect to critical ratio, and the more important a lot is from a market factor standpoint, the greater the lot's processing priority is with respect to market factor.

In one embodiment, scheduling system 502 receives updated lot data when available and recalculates the process scheduling order using the updated lot data.

Table 7, based on the data in Table 4, depicts the flow of lots L1:Ln to their respective next constraint resources to illustrate the effectiveness of the hunger ratio in preventing starvation of constraint resources by the flow of lots L1:L16 to their respective next constraint resources BN1:BN3. The flow is determined by assuming a 1 unit time of processing per lot by each station and adding the process scheduling order of each lot Ly to the plan cycle time PCTLy of each lot Ly.

TABLE 7

| Station (STx) | Lot (Ly) | Hunger Ratio (HRLy) | Process Scheduling Order | Plan Cycle Time (PCTLy) | Flow | Next Constraint Resource (BNi) |
|---|---|---|---|---|---|---|
| ST3 | 16 | −3.4 | 2 | 5 | 7 | 1 |
| ST2 | 10 | −6 | 7 | 1 | 8 | 1 |
| ST2 | 8 | −2.75 | 5 | 4 | 9 | 1 |
| ST2 | 9 | −2.75 | 6 | 4 | 10 | 1 |
| ST1 | 1 | −3.17 | 6 | 6 | 12 | 1 |
| ST1 | 3 | −2.75 | 4 | 8 | 12 | 1 |
| ST1 | 2 | −3.17 | 7 | 6 | 13 | 1 |
| ST3 | 15 | −3 | 1 | 2 | 3 | 2 |
| ST1 | 4 | −3 | 5 | 2 | 7 | 2 |
| ST2 | 12 | −2.5 | 4 | 4 | 8 | 2 |
| ST1 | 5 | −2 | 3 | 6 | 9 | 2 |
| ST2 | 13 | −2 | 2 | 3 | 5 | 3 |
| ST2 | 14 | −2 | 3 | 3 | 6 | 3 |
| ST1 | 7 | −1.29 | 1 | 7 | 8 | 3 |

TABLE 7-continued

| Station (STx) | Lot (Ly) | Hunger Ratio (HRLy) | Process Scheduling Order | Plan Cycle Time (PCTLy) | Flow | Next Constraint Resource (BNi) |
|---|---|---|---|---|---|---|
| ST1 | 6 | −1.33 | 2 | 9 | 11 | 3 |
| ST2 | 11 | −1.44 | 1 | 10 | 11 | 3 |

Thus, the hunger ratio provides a convenient and effective measure to influence processing system efficiency, especially efficiency of a highly reentrant system. Thus, when greater emphasis is placed on the hunger ratio components of the compositie ratios for lots in a processing system, the scheduling order determined by the composite ratio yields a process order that proceses lots in accordance with a schedule that yields improved operational efficiency. The improved operational efficiency results from the focus of the hunger ratio to provide continuous work to each occurrence of a constraint resource in a processing system.

While the invention has been described with respect to the embodiments and variations set forth above, these embodiments and variations are illustrative and the invention is not to be considered limited in scope to these embodiments and variations. For example, it will be recognized by persons of ordinary skill in the art that efficiencies can be built into scheduling system 102's determination of hunger ratios. For example, information that is not needed to determine a hunger ratios for the lots need not be determined by scheduling system 102, such as determining PTWIPSQi if constraint resource BNi is not a next constraint resource for any lot. Accordingly, various other embodiments and modifications and improvements not described herein may be within the spirit and scope of the present invention, as defined by the following claims.

What is claimed is:

1. A method of scheduling processing of lots queued at stations including constraint resources in a processing system, the method comprising the steps of:
    scheduling processing of the lots by the stations at which the lots are queued, and developing a process scheduling order of the lots using respective hunger ratios of each lot, wherein a hunger ratio of each respective lot being defined by a quotient of a respective time that such lot is needed by the next constraint resource of such lot and a respective estimated time for a select lot Ls to arrive at the next constraint resource of lot Ls.

2. The method of scheduling processing as recited in claim 1 wherein the processing system includes n respective lots, L1:Ln, distributed among the stations, the method further comprising the steps of:
    for each lot Ly, y=1, 2, . . . , n, determining a sum, ΣPTBNSLy, of all planned cycle time(s) for each of lots L1:Ln having the same next constraint resource BNi as the lot Ly and having respective planned cycle time(s) less than the planned cycle time, PCTLs, of the select lot;
    for each ΣPTBNSLy, combining ΣPTBNSLy with a sum of all process times, ΣPTWIPQi, of all WIP queued at the next constraint resource BNi of lot Ly to determine the time, TNBNLy, that lot Ly is needed at the next constraint resource BNi of each lot Ly; and
    determining the hunger ratio HRLy for each lot Ly, wherein each HRLy is the ratio between TNBNLy and PCTLs;

wherein the step of scheduling processing further comprises the step of:
scheduling processing of each of lots L1:Ln at the respective stations where lot Ly is queued prior to all of lots L1:Ln which are queued at the same station as lot Ly and have a smaller respective hunger ratio of −(TNBNLy/PCTLs).

3. The method of scheduling processing as recited in claim 2 wherein the select lot Ls is lot Ly.

4. The method of scheduling processing as recited in claim 2 wherein the select lot Ls is a lot at the same station as lot Ly having the largest planned cycle time to the next constraint of lot Ls.

5. The method of scheduling processing as recited in claim 2 further comprising the step of:
reducing the TNBNLy for each respective lot Ly with a time buffer TBBNi associated with the next constraint resource BNi of lot Ly.

6. The method of scheduling processing as recited in claim 5 wherein the step of reducing further comprises the step of:
for each lot Ly, subtracting the time buffer TBBNi associated with the next constraint resource BNi of lot Ly from TNBNLy for lot Ly.

7. The method of scheduling processing as recited in claim 2 wherein the step of combining $\Sigma$PTBNSLy with $\Sigma$PTWIPQ comprises the step of:
adding $\Sigma$PTBNSLy to $\Sigma$PTWIPQ.

8. The method of scheduling processing as recited in claim 1 further comprising the step of:
processing each lot in accordance with the scheduling step.

9. The method of scheduling processing as recited in claim 8 further comprising the step of processing an integrated circuit.

10. The method of scheduling processing as recited in claim 1 wherein the lots comprise a semiconductor wafer.

11. The method of scheduling processing as recited in claim 1 wherein the stations comprise respective semiconductor processing work stations.

12. The method of scheduling processing as recited in claim 1 wherein the semiconductor processing work stations comprise semiconductor processing etching equipment, stepper equipment, cleaner equipment, deposition equipment, thin film equipment, polishing equipment, and diffusion equipment.

13. The method of scheduling processing as recited in claim 1 wherein the processing system comprises a semiconductor manufacturing line.

14. The method of scheduling processing as recited in claim 1 wherein the steps recited in claim 1 comprise instructions stored on a computer readable media, the method further comprising the steps of:
executing the instructions with a processor coupled to the computer readable media.

15. The method of scheduling processing as recited in claim 1 wherein the times that each respective lot is needed by the next constraint resource of each lot in relation to a respective estimated time for each lot to arrive at the next constraint resource of each lot are not proximity sensitive with the respect to the next constraint resource of each lot.

16. The method of scheduling processing as recited in claim 1 further comprising the steps of:
determining the hunger ratio of each respective lot comprising the steps of:
determining the respective approximate time, PCTL, for such lot to arrive at the next constraint resource of such lot; and
determining the time such lot is needed by the next constraint resource of such lot.

17. The method of scheduling processing as recited in claim 16 wherein the step of determining the time such lot is needed comprises the step of:
determining the aggregate amount of approximate processing time required by the next constraint resource of such lot for all of the lots having estimated times to arrive at the next constraint resource of such lot which are less than PCTL.

18. The method of scheduling processing as recited in claim 17 wherein the step of determining the time such lot is needed further comprises the step of:
determining the aggregate of amount of approximate processing time required by the next constraint resource of such lot for all lots queued at the next constraint resource of such lot.

19. The method of scheduling processing as recited in claim 1 wherein n respective lots L1:Ln are queued at the stations, wherein the step of scheduling processing comprises the step of:
for each lot Ly, combining the hunger ratio, HRLy, process scheduling factor of lot Ly with one or more lot process scheduling factors to generate a combined ratio, COMPRLy, of lot Ly; and
scheduling processing of each lot Ly by the station in accordance with the relationship between each COMPRLy value of each lot Ly queued at the same station to achieve production throughput of the system in accordance with a priority of the process scheduling factors combined to generate each COMPRLy.

20. The method of scheduling processing as recited in claim 19 wherein the process scheduling factors include a critical ratio, CRLy, for each lot Ly and market factor, MFLy, for each lot Ly.

21. The method of scheduling processing as recited in claim 20 further comprising the step of:
combining CRLy, MFLy, and HRLy to generate COMPLy for each lot Ly.

22. The method of scheduling processing as recited in claim 21 further comprising the step of:
multiplying the process scheduling factors HRLy, CRLy, and MFLy by weighting factors, .X, .Y, and .Z, respectively, to affect the respective influence of the scheduling factors CRLy, MFLy, and HRLy on the value of COMPRLy;
wherein the step of combining CRLy, MFLy, and HRLy comprises the step of:
adding the weighted HRLy, CRLy, and MFLy, wherein COMPRLy=(.X)HRLy+(.Y)CRLy+(.Z)MFLy.

23. The method of scheduling processing as recited in claim 22 wherein X, Y, and Z are real numbers and .X+.Y+.Z=1.

24. The method of scheduling processing as recited in claim 19 wherein the process scheduling factors include a critical ratio, CRLy, for each lot Ly, the method further comprising the step of:
determining the approximate of time, COMPTLy, by which lot Ly will be early or late in completing processing by the system;
determining a time, DDATELy, on which lot Ly is due to complete processing by the system; and
generating CRLy for each lot Ly, wherein CRLy= COMPTLy/DDATELy.

25. The method of scheduling processing as recited in claim 19 wherein the process scheduling factors include a market factor, MFLy, for each lot Ly, the method further comprising the step of:
  determining the market factor MFLy for each lot Ly, wherein each market factor MFL1:MFLn represents the relative market importance of lots L1:Ln, respectively.

26. The method of scheduling processing as recited in claim 19 further comprising the step of:
  adjusting each factor in accordance with an appropriate influence on the COMPRLy of each lot Ly.

27. The method of scheduling processing as recited in claim 26 wherein the step of adjusting comprises the step of:
  multiplying each factor by a weighting factor.

28. A manufacturing system comprising:
  a scheduling system to schedule processing of n lots L1:Ln by stations at which the lots are queued, wherein the process scheduling order of a lot Ly precedes all lots of lots L1:Ln that are queued at the same station as lot Ly, said lots L1:Ln having a composite ratio indicating a lower processing priority than a composite ratio, COMPRLy, of lot Ly, wherein the composite ratio of the lot Ly includes a hunger ratio, HRLy, and the hunger ratio of lot Ly is the ratio of the approximate time the lot Ly is needed at a next constraint resource of the lot Ly to the approximate time for a select lot Ls to arrive at the next constraint resource of the lot Ls;
  means for manufacturing a product based on said processing schedule.

29. The manufacturing system as recited in claim 28 wherein the composite ratio of a lot further includes a critical ratio, CR, of the lot, and the critical ratio of the lot is a ratio of an approximate time that the lot is early or late in completing processing in the manufacturing system to a time that a lot is due.

30. The manufacturing system as recited in claim 29 wherein the composite ratio of a lot further includes a market factor, MF, of the lot, and the market factor of the lot is a measure of the importance of the market value of the lot relative to the importance of the market value of the remaining n−1 lots.

31. The manufacturing system as recited in claim 30 wherein the hunger ratio, the critical ratio, and the market factor of the composite ratio of a lot are each weighted by their respective relative importance.

32. The manufacturing system as recited in claim 31 wherein the composite ratio, COMPR, of a lot equals (.X) times HR plus (.Y) times CR plus (.Z) times MF, wherein X, ., and Z are real numbers.

33. The manufacturing system as recited in claim 28 wherein s=y so that lot Ls is lot Ly.

34. The manufacturing system as recited in claim 28 wherein the lot Ls is a lot at the same station as lot Ly having the largest planned cycle time to the next constraint of lot Ls.

35. The manufacturing system as recited in claim 28 wherein the composite ratio of a lot further includes a market factor of the lot, and the market factor of the lot is a measure of the importance of the market value of the lot relative to the importance of the market value of the remaining n−1 lots.

36. The manufacturing system as recited in claim 28 wherein the approximate time the lot, Ly, is needed at the next constraint resource of the lot Ly includes the sum of all estimated process times by the constraint resource of the lot Ly for all lots having the same next constraint resource as lot Ly and having planned cycle times to the next constraint resource of lot Ly less than the planned cycle time of lot Ly to the next constraint resource of lot Ly.

37. The manufacturing system as recited in claim 28 wherein the manufacturing system is a reentrant manufacturing system.

38. The manufacturing system as recited in claim 28 wherein the hunger ratio of each lot is not proximity sensitive with the respect to the next constraint resource of each lot.

39. The manufacturing system as recited in claim 28 wherein the scheduling system is comprised of a computer system having a processor coupled to a computer readable media and a display device, wherein the computer readable media includes instructions to determine the sums, $\Sigma PTBNSL1:\Sigma PTBNSLn$, to determine the times, $TNBNL1:TNBNLn$, needed at the next constraint resources of L1:Ln, respectively, and to schedule processing of lots L1:Ln.

40. A scheduling system comprising:
  computer readable media;
  a scheduling module stored on the computer readable media to determine the sums, $\Sigma PTBNSL1:\Sigma PTBNSLn$, wherein $\Sigma PTBNSLy$ includes the sum of all process times of a next constraint resource BNi of a lot Ly of lots L1:Ln which have planned cycle times less than a planned cycle time, PCTLy, of lot Ly to the next constraint resource BNi of lot Ly, to add the process times, $\Sigma PTWIPQi$, of any work in process, WIP, at the next constraint resource BNi of lots L1:Ln, respectively, to $\Sigma PTBNSL1:\Sigma PTBNSLn$, respectively, to determine the times, TNBNL1:TNBNLn, needed at the next constraint resources of L1:Ln, respectively, and to schedule processing of lots L1:Ln queued among a plurality of stations at which each of lots L1:Ln is scheduled to be processed prior to all lots at the same station having a respective composite ratio that corresponds to a lesser need for such lots, wherein the composite ratio for each lot Ly comprises a respective hunger ratio HRLy, and HRLy comprises a quotient of TNBNLy and PCTLy.

41. The scheduling system as recited in claim 40 wherein the scheduling module is further capable of compensating TNBNLy for each respective lot Ly with a time buffer TBBNi associated with the next constraint resource BNi of lot Ly.

42. The scheduling system as recited in claim 40 wherein the hunger ratio HRLy=−(TNBNLy/PCTLy).

43. The scheduling system as recited in claim 40 wherein the scheduling system further comprises:
  a processor coupled to a computer readable media having instructions to determine the sums, $\Sigma PTBNSL1:\Sigma PTBNSLn$, add the process times, $\Sigma PTWIPQi$, and to schedule the processing of each lot Ly.

44. The scheduling system as recited in claim 40 wherein each lot comprises a semiconductor wafer.

45. The scheduling system as recited in claim 40 wherein the plurality of stations comprise semiconductor processing etching equipment, stepper equipment, cleaner equipment, deposition equipment, thin film equipment, polishing equipment, and diffusion equipment.

46. The scheduling system as recited in claim 40 wherein the composite ratio of a lot further includes a weighted critical ratio, CR, of the lot, and the critical ratio of the lot is a ratio of an approximate time until the lot completes processing in the manufacturing system to a time that a lot is due, and the weight of CR controls the influence of CR on the composite ratio.

47. The scheduling system as recited in claim 40 wherein the composite ratio of a lot further includes a weighted market factor, MF, of the lot, and the market factor of the lot is a measure of the importance of the market value of the lot relative to the importance of the market value of other lots, and the weight of MF controls the influence of MF on the composite ratio.

48. The scheduling system as recited in claim 40 the composite ratio of a lot further includes (i) a weighted critical ratio, CR, of the lot, and the critical ratio of the lot is a ratio of an approximate time until the lot completes processing in the manufacturing system to a time that a lot is due and (ii) a weighted market factor, MF, of the lot, and the market factor of the lot is a measure of the importance of the market value of the lot relative to the importance of the market value of other lots, wherein the hunger ratio is also weighted, and the weights of the hunger ratio, CR, and MF control the respective influence of the hunger ratio, CR, and MF on the composite ratio.

49. The scheduling system as recited in claim 48 wherein the composite ratio equals the sum of the weighted hunger ratio, CR, and MF.

* * * * *